(12) United States Patent
Gelhar

(10) Patent No.: US 9,835,461 B2
(45) Date of Patent: Dec. 5, 2017

(54) DATABASE MANAGEMENT USING FORMAT DESCRIPTION

(75) Inventor: Jens Gelhar, Hamburg (DE)

(73) Assignee: HARMAN BECKER AUTOMOTIVE SYSTEMS GMBH, Karlabad (DE)

( * ) Notice: Subject to any disclaimer, the term of this patent is extended or adjusted under 35 U.S.C. 154(b) by 0 days.

(21) Appl. No.: 11/775,666

(22) Filed: Jul. 10, 2007

(65) Prior Publication Data

US 2008/0140605 A1 Jun. 12, 2008

(30) Foreign Application Priority Data

Jul. 10, 2006 (EP) ..................................... 06014255

(51) Int. Cl.
*G06F 7/00* (2006.01)
*G06F 17/30* (2006.01)
*G01C 21/32* (2006.01)

(52) U.S. Cl.
CPC ....... *G01C 21/32* (2013.01); *G06F 17/30569* (2013.01)

(58) Field of Classification Search
CPC .......................... G01C 21/32; G06F 17/30569
See application file for complete search history.

(56) References Cited

U.S. PATENT DOCUMENTS

| | | | | |
|---|---|---|---|---|
| 5,808,565 A * | 9/1998 | Matta | ................. | G01C 21/3629 340/988 |
| 6,192,314 B1 * | 2/2001 | Khavakh | ................ | G01C 21/34 701/410 |
| 6,424,933 B1 | 7/2002 | Agrawala et al. | | |
| 6,526,348 B1 * | 2/2003 | McDonough | .......... | G01C 21/32 340/995.1 |
| 7,076,363 B1 * | 7/2006 | Schmitz | ............. | G01C 21/3632 340/990 |
| 2002/0087262 A1 * | 7/2002 | Bullock et al. | ............... | 701/202 |
| 2002/0103597 A1 * | 8/2002 | Takayama et al. | ........... | 701/200 |
| 2002/0169778 A1 * | 11/2002 | Natesan | ................. | G01C 21/32 |
| 2005/0131638 A1 * | 6/2005 | Sencaj | ............... | G01C 21/3676 701/533 |
| 2006/0253508 A1 * | 11/2006 | Colton et al. | ................. | 707/206 |
| 2006/0277170 A1 * | 12/2006 | Watry et al. | ...................... | 707/3 |
| 2008/0027643 A1 * | 1/2008 | Basir et al. | ................... | 701/213 |

FOREIGN PATENT DOCUMENTS

WO    WO 03/094007 A1    11/2003
WO    2005083640    9/2005

OTHER PUBLICATIONS

Volz, S. and Bofinger, J.M., "Integration of spatial data within a generic platform for location-based applications", Proceedings of the Joint International Symposium on Geospatial Theory, Processing and Applications, Ottawa, Canada, 2002.*
M. MacMahon, "MARCO: A modular architecture for following route instructions," in Proc. AAAI-05 Workshop Modul. Constr. Human-Like Intell., Pittsburg, PA, Jul. 2005, pp. 48-55.*

* cited by examiner

*Primary Examiner* — Jay Morrison
(74) *Attorney, Agent, or Firm* — Artegis Law Group, LLP

(57) ABSTRACT

A system manages a database through a format description table. The format description table provides instructions for operating an abstract machine. Based on the instructions, the abstract machine reads application data and parses the application data to an application software. The abstract machine may provide the application software with semantic information related to the application data to enable the application software to interpret and process the application data.

28 Claims, 6 Drawing Sheets

DATABASE MANAGEMENT USING FORMAT DESCRIPTION

PRIORITY CLAIM

This application claims the benefit of priority from European Patent Application No. 06014255.1, filed Jul. 10, 2006, which is incorporated by reference.

BACKGROUND OF THE INVENTION

1. Technical Field

The invention relates to databases, and in particular, to managing databases for navigation systems.

2. Related Art

Vehicle navigation systems may utilize large databases for storing relevant information. Developments in vehicle navigation and other applications provide information and functions to consumers. The information and functions may reside in a memory.

For vehicle navigation systems that have limited computer resources, such as in an embedded system, efficient management of large databases may be difficult. A large database may be difficult to access, affecting the performance of a navigation system. Performance may be further impaired when databases are updated or made backwards compatible. Therefore a need exists for managing databases in a reliable and efficient manner that allows for system expansions without losing compatibility.

SUMMARY

A system manages a database through a format description table. The format description table provides instructions for operating an abstract machine. Based on the instructions, the abstract machine reads application data and parses the application data to an application software. The abstract machine may provide the application software with semantic information related to the application data to enable the application software to interpret and process the application data.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
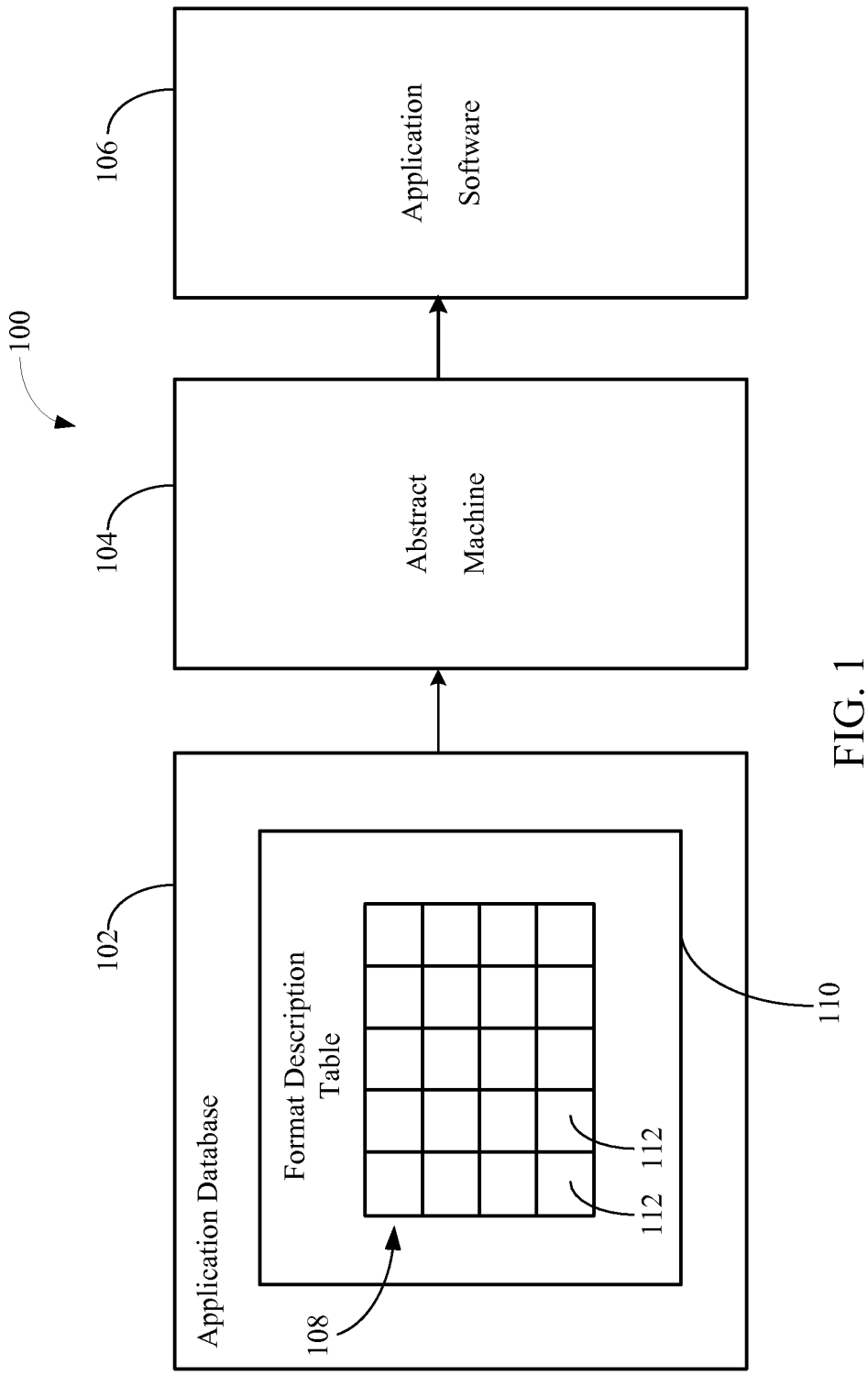
FIG. 1 is an exemplary system that manages an application database.

FIG. 1 is an exemplary system 100 that manages an application database 102 using a format description. The system 100 includes the application database 102 and an abstract machine 104 operable to read data stored in the application database 102. The abstract machine 104 reads data stored in the application database 102 and passes the read data to application software 106 for processing. The processing may format the data to be sent to another system or a user. The system 100 uses format description to control operation of the abstract machine 104 and to provide information the application software may use to interpret data received from the abstract machine 104. Format description enables efficient management and use of the application database 102. The efficiency may be maintained through further extensions of the database 102 and/or software 106 without a loss of compatibility.

A format description may be implemented through a format description table 108. The format description table 108 may have one or more data files 110 stored in the application database 102. The format description declares record types associated with records of the data files. The record types may include integers, character strings, pointers and/or other data types. The format description may also declare the sequence of elements of the records. The format description may represent a byte code to be interpreted by the abstract machine 104 and passed to the application software 106. Where a format description is implemented for more than one data file 110, the same format description may be implemented for each data file.

The format description table 108 may be generated in a header of a data file 110 that may define the record types used in the data file 110. The format description table declares a sequence of data blocks or data elements that constitute the records of the data file 110. In some systems it is not limited to a specific hardware or a specific software.

The format description table 108 includes data blocks 112 consisting of records formed by data elements. The data elements may include data relevant to the application in which the application database 102 is implemented. In a vehicle navigation application, the data elements may include navigation data and other information relevant to a vehicle navigation application. The data file 110 may be stored on, distributed across, or read from one or more storage devices such as hard disks, floppy disks, DVDs, and CD-ROMs; a signal received from a network; or other forms of ROM or RAM.

The data blocks 112 may include character strings. The character strings may be compressed by a token-based compression. Byte values that are not present in a compressed string may be used as tokens, with a byte sequence of arbitrary or predetermined length assigned to each token. The abstract machine 104 may uncompress a compressed string by replacing each string byte representing a token with the string byte's assigned replacement sequence. A token table calculated for each data block 112 may be used to manage the tokens.

The format description table 108 may include a sequence of binary rows, each row including a predetermined number of words or data entries, such as an 8 or a 16 bit number. Each row may include one or more parser instructions to be read by the abstract machine. The first row of the format description table 108 may be a header. Each row may have the same length defined in the header of the format description table 108. The parser instruction controls the type of data the abstract machine will read. The parser instruction may consist of a fixed-length or variable-length integer, character strings, or a pointer for referencing records in the data file 110.

The parser instruction may include branching instructions. The instructions may cause a pointer to jump from one record to another, or parse a nested record. The parser instructions may be conditional instructions. The abstract machine 104 may be enabled to evaluate a conditional expression and, based on the evaluation, execute or skip the instruction. The abstract machine 104 may also execute loop commands that read arrays or lists of data entities related to data stored in the data file of the application database 102. The parser instructions may include register access and register write instructions.

Each row of the format description table 108 may include a syntax ID and a semantic ID for controlling the abstract machine 104. The second and third words of a row of the format description table 108 may be the syntax ID and semantic ID, respectively. The syntax ID may be an integer that programs the abstract machine 104. A syntax ID may enable the abstract machine 104 to read data of a particular format and/or perform a predetermined arithmetic operation on the data read by the abstract machine 104. The abstract machine 104 may include or be operable to access registers for performing arithmetic operations defined in a syntax ID.

The semantic ID represents a tag provided for each data element of the records. The abstract machine 104 passes the semantic ID number together with the corresponding data element read by the abstract machine 104 to the application software 106. The semantic ID enables the application software 106 to interpret the data element read by and received from the abstract machine 104. Unknown semantic IDs may be ignored, to allow the addition of new format extensions without losing compatibility of the current version of the application software 106. Use of the semantic ID provides a flexible and extendable application database 102.

In the semantic structure, the abstract machine 104 may ignore data elements of a row that follow a predetermined number of data entries. The abstract machine 104 may consider only the first ten words of a row, with the first word providing parser instructions for the abstract machine 104. Accordingly, in a subsequent software release, additional data, such as proprietary data, may be added to the data elements of a record that are ignored by application software 106 associated with a first standard version but that can be interpreted by a more recent software version. Unknown semantic IDs introduced by more recent versions may be ignored by an abstract machine 104 and/or application software 106 that is not up-to-date.

The abstract machine 104 reads and interprets data elements of the data blocks 112 based on instructions included in the format description table 108. The abstract machine 104 may be a controller or a virtual machine that separates input into more easily processed components. The abstract machine 104 may be a parser such as a table-controlled parser that reads and prepares application data for processing by the application software 106. In one system, the abstract machine 104 may be programmed to generate a parse tree from the data stored as data blocks. The parse tree or other parsing results generated by the abstract machine 104 may be further processed by the application software 106, such as for code generating by a compiler or executing by an interpreter.

Mapping of the data elements of the application database 102 to a binary, text, or other format may be defined in the format description table 108, and in some applications, may not be performed by the application software 106 itself. Features of the application database 102, including storage size, may be modified without the need to modify the application software 106.

Database modifications, enhancements, and/or extensions may be implemented through modification of the format description or by implementing additional format descriptions without requiring modification of the software. Where additional format descriptions are implemented, a first format description may employ syntax elements (such as read, skip, access to register, or other instructions) of a first standard software version stored in the application database 102 that enables software compatible with the first standard. One or more additional format descriptions may be retained that employ additional syntax elements defined by more newer or updated versions of the first standard.

Figure 2:
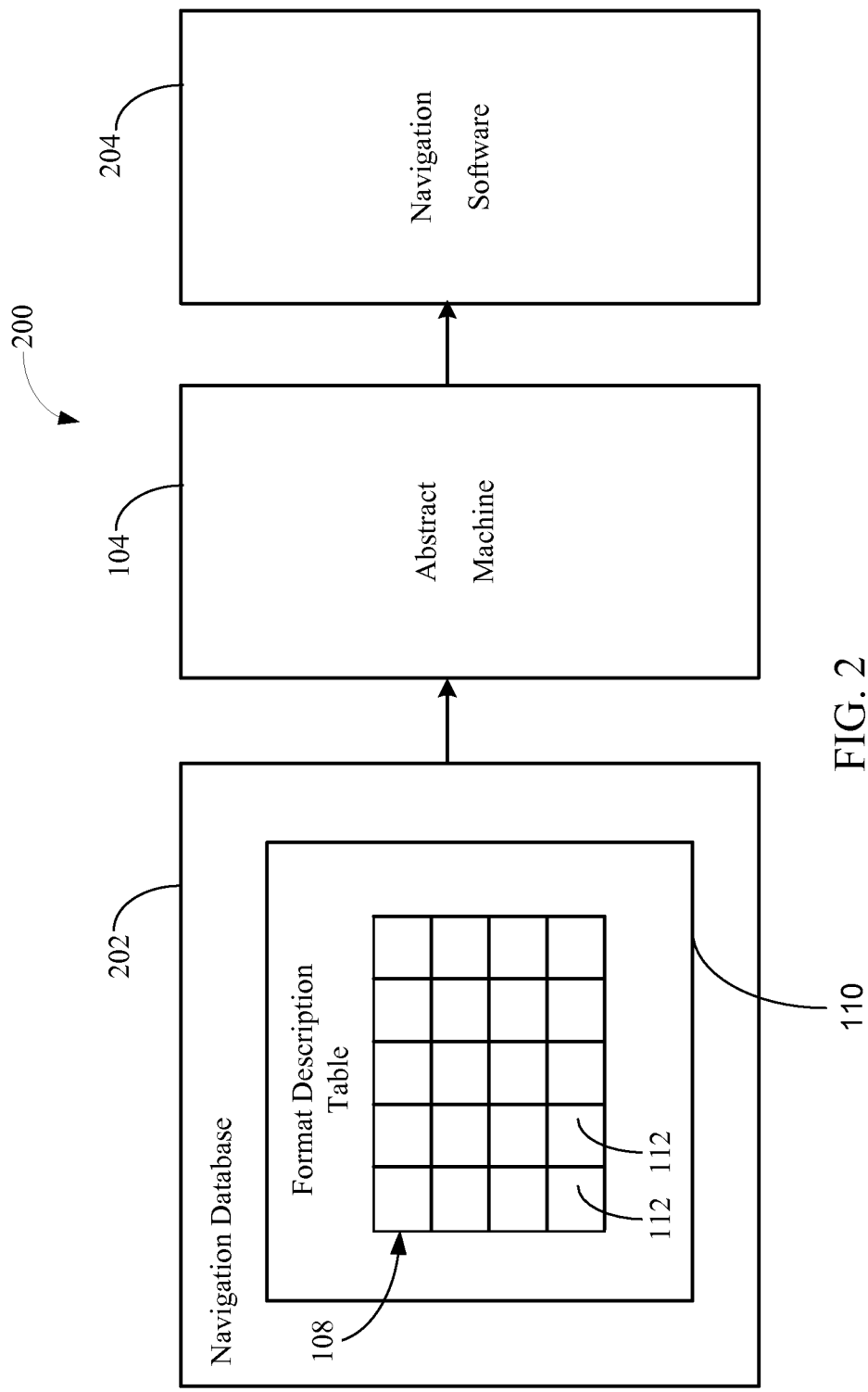
FIG. 2 is an exemplary navigation system.

The system 100 for managing an application database 102 may be implemented for various application types. FIG. 2, for example, is an exemplary vehicle navigation system 200. The navigation system 200 includes a navigation database 202 and navigation software 204. The navigation database 202 retains navigation data, such as information related to streets, lanes, traffic signs, crossing views, buildings, topographical data, geographic data, or other data related to navigation through a city, state or province, country, or other geographic region.

Figure 3:
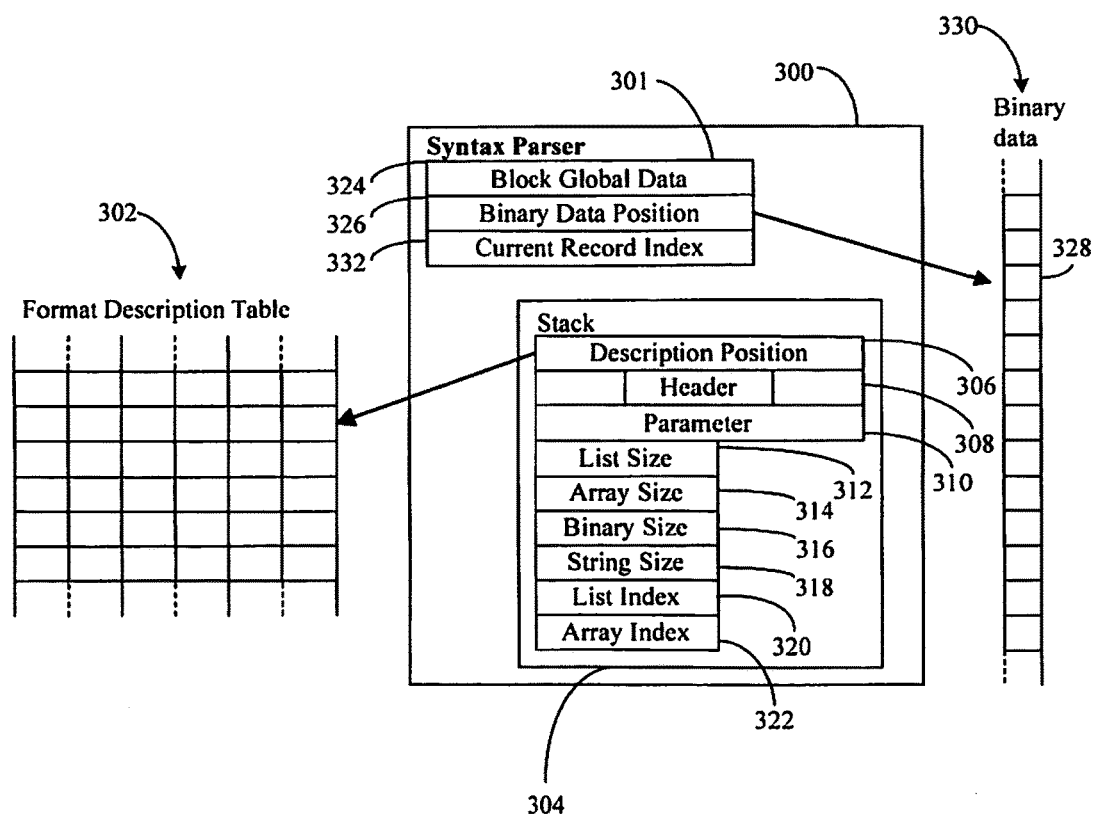
FIG. 3 is an exemplary abstract machine implemented through a syntax parser.

FIG. 3 is an exemplary abstract machine 300 implemented through a syntax parser 301. The syntax parser 301 interprets data in the format description table 302 as a byte code based on instructions stored in the format description table 302. The format description table 302 may include rows of the same length, each consisting of a set of words. The format description table 302 may include parser instructions that control the selection of binary data elements read by the syntax parser. The format description table 302 may include information identifying the format of the data to be read by the syntax parser 301. The format description table 302 may include information related to the transfer of data read by the syntax parser 301 to a register. The format description table 302 may include information related to the semantics of data read by the syntax parser 301 that may be relevant to the application software.

The syntax parser 301 includes one or more registers. The registers may enable the syntax parser 301 to perform arithmetic operations and conditional execution of instructions, as well as execution of loop instructions for reading arrays and lists of data elements. A stack-like structure 304 may be implemented for multiple registers to manage nested record declarations, such as when a record type includes a data element of another record type.

A description position register 306 points to a current instruction in the format description table 302. A header register 308 may be a working register in which the syntax parser 301 loads a numerical value that may, for example, be used to control a conditional execution of table rows. A parameter register 310 facilitates management of nested records. The parameter register 310 may include a zero for the uppermost level and a high level bit, such as a 32 bit parameter value, for inner records.

List size, array size, binary, and string size registers 312, 314, 316, and 318 respectively, facilitate management of data lists and arrays by designating repeated reading or reading up to a particular list entry. The registers 312, 314, 316, and 318 may facilitate control of special binary data blocks that represent, for example, bitmap images or cryptic binary encoding. List and array index registers 320 and 322, respectively, facilitate managing iteration of the syntax parser 301 over list and array elements, respectively.

A block global data register 324 stores global information associated with a currently parsed block, such as the block index that identifies a data block, the number of records contained in the block, or other global information. The block global data register 324 may include a set of registers for storing the global information of a currently parsed block. A binary data position register 326 points to a byte position 328 in the binary data of a block 330. Data to be read pursuant to a parser instruction may be read from the byte position identified by the binary data position register 326. A current record index 332 includes a record index of the pointer to a currently parsed record or list element.

Figure 4:
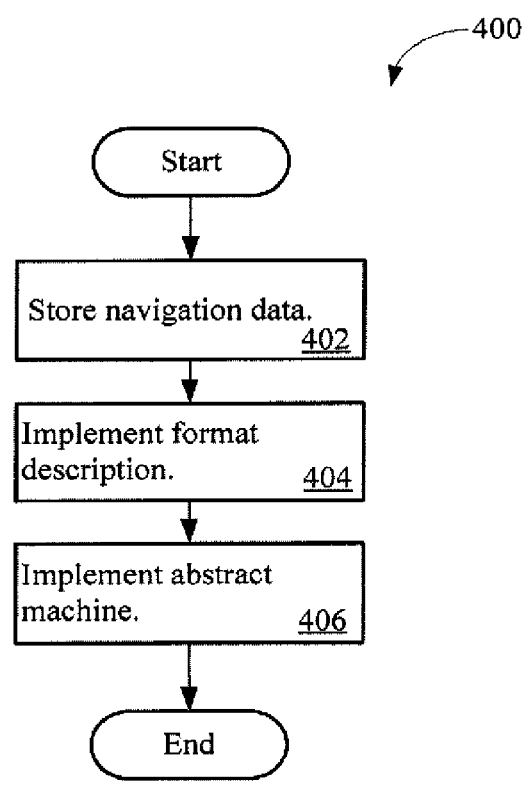
FIG. 4 is an exemplary process that manages navigation data resident to a navigation database.

FIG. 4 is an exemplary process that provides a product for managing navigation data in a navigation database implemented in a navigation system. Navigation data is stored in one or more data files in the navigation database (Act 402). While the process is described in the context of a navigation system, the process applies to the management of databases used in other applications. The data stored in the data files may be relevant to, or otherwise used in, the application in which the database is implemented.

In a vehicle navigation system the data may include information related to streets, lanes, traffic signs, crossing views, buildings, topographical data, geographic data, or other data relevant to vehicle navigation for a city, state or province, country, or other geographic region. The data files may be stored on, distributed across, or read from one or more storage devices such as hard disks, floppy disks, DVDs, and CD-ROMs; a signal received from a network; or other forms of ROM or RAM either currently known or later developed.

The process 400 implements a format description for one or more of the data files (Act 404). The format description may be implemented as a format description table on the same medium as the navigation database or on a different medium. When implemented on the same medium as the navigation database, the format description table may be implemented directly in a data file of the navigation database or in a data volume separate from the data volumes of the navigation database. The format description table may be implemented in a header of a data file. The format description may be implemented in an already existing navigation database by a network transfer through a publicly accessible distributed network like the Internet or may be provided separately on a DVD, CD-ROM, or other mediums.

The format description table includes rows of data records to be read by an abstract machine and passed to navigation software. The data records may be organized in data blocks, each row including a predetermined number of data blocks. The data blocks include data elements related to navigation information to be used by the navigation system. Each row of the format description table includes one or more parser instructions, syntax IDs, and semantic IDs for controlling operation of the abstract machine.

The process implements an abstract machine for reading and interpreting the navigation data stored in the data files (Act 406). The abstract machine may be implemented in hardware or as a virtual machine through software. The abstract machine may be implemented as a controller or parser that reads and prepares navigation data to be processed by the navigation software. The abstract machine is configured to read instructions from the format description table related to interpreting navigation data stored in the data files and for parsing the data to the navigation software to enable the navigation software to filter information that is recognizable and usable by the navigation software.

Figure 5:
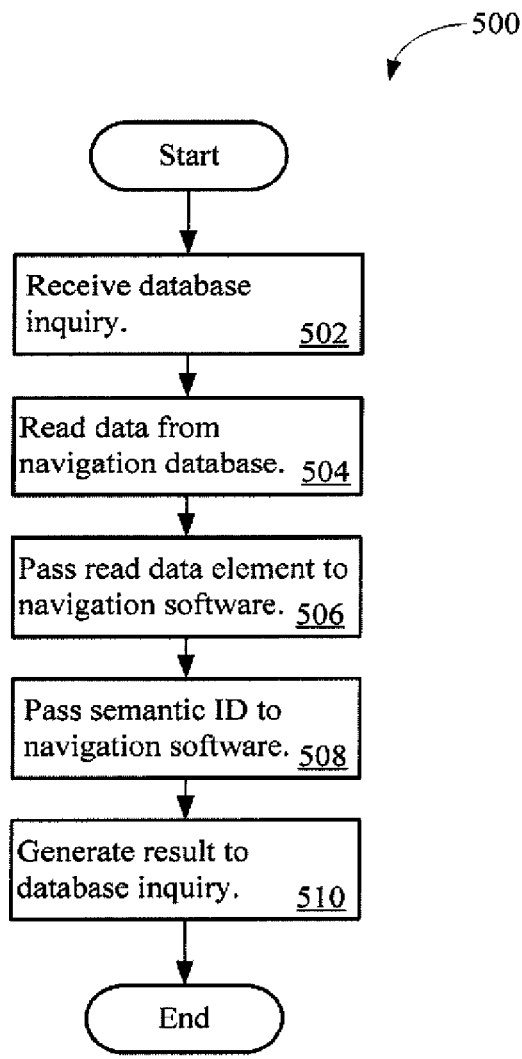
FIG. 5 is second exemplary process that manages data resident to the navigation database.

FIG. 5 shows an exemplary process for managing data in a navigation database. The process receives a database inquiry (Act 502). A database inquiry may be a request for navigation data stored in the database. As a vehicle travels, the database inquiry may be generated to obtain data related to the geographical region into which the vehicle is traveling and to update a map display or provide visual or acoustic guidance as the vehicle travels. The database inquiry may also be in response to a user query.

The process reads one or more data elements from the navigation database in response to the database inquiry (Act 504). An abstract machine, such as a parser, reads the data elements based on parser instructions of a format description table. The format description table includes instructions. The instructions may be related to jumping from one record of the navigation database to another, parsing nested records, for evaluating and executing conditional instructions, performing arithmetic operations, or other functions for controlling the abstract machine. The process passes the read data elements from the navigation database to navigation software. (Act 506).

The process passes semantic IDs associated with each of the read data elements to the navigation software (Act 508). The abstract machine parses the semantic ID to the application software along with the data element read based on parser instruction. The semantic ID represents a data tag to be interpreted by the application software. Through semantic IDs the application software may interpret the meaning of the data elements. Unknown semantic IDs may be ignored. Accordingly, format extensions may be implemented through the use of new semantic IDs without loss of compatibility between different versions of the application software and/or the application database.

The data elements and semantic IDs are processed by the navigation software to generate a result to the database inquiry. (Act 510). The result of the database inquiry may be used by the navigation software to update a map display, provide navigation directions to a user, identify a point of interest, generate an audio or visual guidance prompt, or for other navigation system operations.

Figure 6:
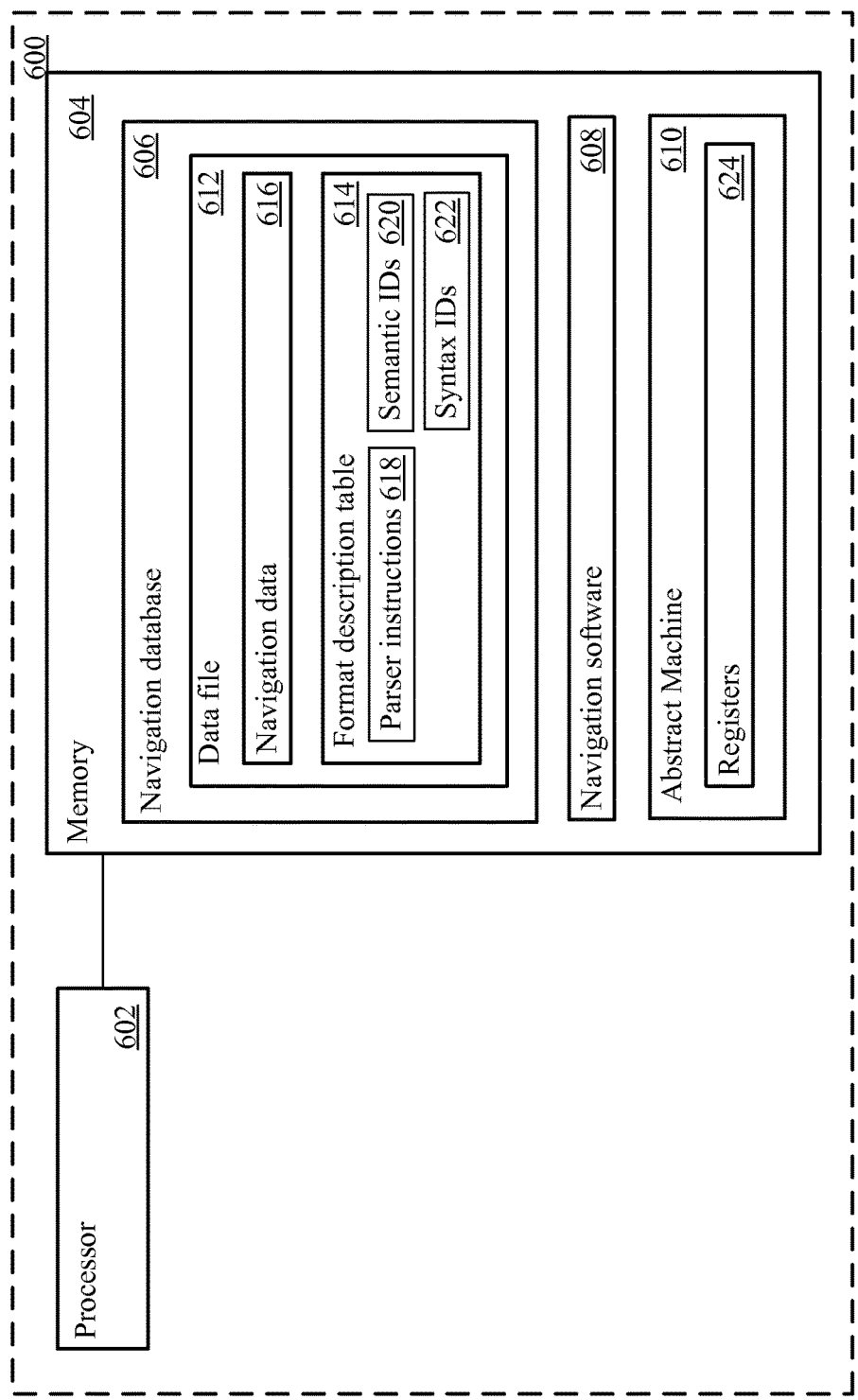
FIG. 6 is a second exemplary navigation system.

FIG. 6 is a second exemplary navigation system 600. The navigation system 600 includes a processor 602 and a memory 604. The processor 602 may execute instructions stored in a local memory 604 (or distributed memory) to control operation of the navigation system 600, including efficient use and management of a navigation database 606 stored in the memory 604. The navigation database 606 may be a binary encoded read-only database or other database type.

Although selected aspects, features, or components of the implementations are depicted as being stored the memory 604, all or part of the systems, including the methods and/or instructions for performing such methods consistent with the navigation system 600, may be stored on, distributed across, or read from other computer-readable media, for example, secondary storage devices such as hard disks, floppy disks, CD-ROMs, and DVDs; a signal received from a network; or other forms of ROM or RAM either currently known or later developed.

The processor 602 may be implemented as a microprocessor, microcontroller, application specific integrated circuit (ASIC), discrete logic, or a combination of other types of circuits or logic. Similarly, the memory 604 may be DRAM, SRAM, Flash, or any other type of memory. Data (e.g., navigation data), databases, and other data structures may be separately stored and managed, may be incorporated into a single memory or database, or may be logically and physically organized in many different ways. Programs, processes, and instruction sets may be parts of a single program, separate programs, or distributed across several memories and processors.

The memory 602 may store navigation software 608 and an abstract machine 610. In another system, the abstract machine 610 may be implemented in hardware through a controller and memory 604. The navigation database 606 stored in the memory 604 may include a data file 612 and a format description table 614. The data file 612 may be accessed by a data management system that can access data related to streets, lanes, traffic signs, crossing views, buildings, topographical data, geographic data, or other data relevant to vehicle navigation for a city, state or province, country, or other geographic region. The navigation data 616 stored in the memory 604 may be at least partially packed or compressed. The abstract machine 610 may be operable to interpret packed data.

The format description table 614 may be a part of or separate from the data file 612. In another system, the memory 604 may store the format description table at a location separate from the location of the navigation database 606.

The format description table 614 may include parser instructions 618 for controlling parsing operations of the abstract machine 610. The format description table 614 may also include semantic IDs 620 and syntax IDs 622. The semantic IDs 620 may include information the navigation software 608 may use to interpret data it receives from the abstract machine 610. The syntax IDs 622 include information that directs the abstract machine 610 in processing data stored in the format description table 614, such as to perform an arithmetic operation on the data read by the abstract machine 610, or related to which data type the abstract machine 610 is to read.

The abstract machine 610 may include one or more registers 624. The abstract machine 610 may use the registers 624 to perform arithmetic operations or other processing operations on the navigation data 616 read from the data file 610.

The methods, processes, programs, and/or instructions may be encoded in a computer-readable medium such as a memory, programmed within a device such as one or more integrated circuits, or processed by a controller or a computer. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as an analog electrical, audio, or video signal. The software may be embodied in any computer-readable medium for use by, or in connection with an instruction executable system, apparatus, or device. Such a system may include a computer-based system, a processor-containing system, or another system that may selectively fetch instructions from an instruction executable system, apparatus, or device that may also execute instructions.

A "computer-readable medium" or "machine-readable medium" may comprise any means that contains, stores, communicates, propagates, or transports software for use by or in connection with an instruction executable system, apparatus, or device. The computer-readable medium may selectively be, but not limited to, an electronic, magnetic, optical, electromagnetic, infrared, or semiconductor system, apparatus, or device. A non-exhaustive list of examples of a computer-readable medium may include: an electrical connection (electronic) having one or more wires, a portable magnetic or optical disk, a volatile memory such as a Random Access Memory "RAM" (electronic), a Read-Only Memory (ROM) (electronic), an Erasable Programmable Read-Only Memory (EPROM or Flash memory) (electronic), or an optical fiber (optical). A computer-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

I claim:

1. A system included within a vehicle for managing data requests from an application, the system comprising:
   a database that stores a data file that includes application data and a format description table, wherein the format description table includes a plurality of data blocks associated with the application data and a plurality of rows, wherein each row includes one or more parser instructions; and
   an abstract machine coupled to the database, wherein the abstract machine:
      in response to a query for navigation data generated while the vehicle is traveling, reads the application data included in the data file based on at least one parser instruction included in the format description table; and
      transmits the application data read from the data file and one or more semantic identifiers to a software application based on at least one parser instruction included in the format description table, wherein the software application interprets the application data read from the data file based on the one or more semantic identifiers to generate visual or acoustic guidance as the vehicle travels,
      wherein the database and the abstract machine reside in a memory that is coupled to a processor, and the processor executes the abstract machine.

2. The system of claim 1, where the data file comprises a header that defines types of records used in the data file and identifies a sequence of data elements in the records.

3. The system of claim 2, where the format description table is implemented in the header.

4. The system of claim 1, where the format description table comprises multiple rows, each row comprising a predetermined number of data entries and at least one parser instruction.

5. The system of claim 4, each row comprising a syntax identifier.

6. The system of claim 4, each row comprising a semantic identifier.

7. The system of claim 4, where the abstract machine ignores data entries in a row that follow a predetermined number of data entries.

8. The system of claim 1, the abstract machine comprises at least one register.

9. The system of claim 1, where the application data is at least partially packed, and the abstract machine interprets packed data.

10. The system of claim 1, where the application data comprises navigation data and the software application comprises navigation software.

11. A non-transitory computer-readable storage medium including instructions that, when executed by a processor, cause the processor to:
in response to a query for navigation data generated while the vehicle is traveling, read the navigation data stored in a data file included in a navigation database according to parser instructions stored in a format description table associated with the data file, wherein the format description table includes a plurality of data blocks associated with the navigation data and a plurality of rows, wherein each row includes one or more parser instructions; and
transmit the navigation data read from the data file and one or more semantic identifiers to a navigation software application based on at least one parser instruction included in the format description table, wherein the navigation software application interprets the application data read from the data file based on the one or more semantic identifiers to generate visual or acoustic guidance as the vehicle travels.

12. The non-transitory computer-readable storage medium of claim 11, where the parser instructions included in the format description table are based on the format of the navigation data to be read from the navigation database.

13. The non-transitory computer-readable storage medium of claim 11, where the format description table is installed in a header of the data file.

14. The non-transitory computer-readable storage medium of claim 11, where the parser instructions stored in the format description table include one or more syntax identifiers.

15. The non-transitory computer-readable storage medium of claim 14, where at least one of the syntax identifiers provides instructions for performing arithmetic operations on the navigation data read from the navigation database.

16. The non-transitory computer-readable storage medium of claim 14, where at least one of the syntax identifiers provides instructions related to a format type of the navigation data to be read from the navigation database.

17. A vehicle navigation system included within a vehicle, the system comprising:
a processor;
a memory coupled to the processor that includes instructions that, when executed by the processor, cause the processor to:
in response to a query for navigation data generated while the vehicle is traveling, read the navigation data stored in a data file included in a navigation database according to parser instructions stored in a format description table associated with the data file, wherein the format description table includes a plurality of data blocks associated with the navigation data and a plurality of rows, wherein each row includes one or more parser instructions; and
transmit the navigation data read from the data file and one or more semantic identifiers to a navigation software application based on at least one parser instruction included in the format description table, wherein the navigation software application interprets the application data read from the data file based on the one or more semantic identifiers to generate visual or acoustic guidance as the vehicle travels.

18. The vehicle navigation system of claim 17, where the parser instructions included in the format description table are based on the format of the navigation data to be read from the navigation database.

19. The vehicle navigation system of claim 17, where the format description table is installed in a header of the data file.

20. The vehicle navigation system of claim 17, where the parser instructions stored in the format description table include one or more syntax identifiers.

21. The vehicle navigation system of claim 20, where at least one of the syntax identifiers provides instructions for performing arithmetic operations on the navigation data read from the navigation database.

22. The vehicle navigation system of claim 20, where at least one of the syntax identifiers provides instructions related to a format type of the navigation data to be read from the navigation database.

23. A method for managing data requests from a navigation software application included within a vehicle, the method comprising:
in response to a query for navigation data generated while the vehicle is traveling, reading the navigation data stored in a data file included in a navigation database according to parser instructions stored in a format description table associated with the data file, wherein the format description table includes a plurality of data blocks associated with the navigation data and a plurality of rows, wherein each row includes one or more parser instructions; and
transmitting the navigation data read from the data file and one or more semantic identifiers to the navigation software application based on at least one parser instruction included in the format description table, wherein the navigation software application interprets the application data read from the data file based on the one or more semantic identifiers to generate visual or acoustic guidance as the vehicle travels.

24. The method of claim 23, where the parser instructions included in the format description table are based on the format of the navigation data to be read from the navigation database.

25. The method of claim 23, where the format description table is installed in a header of the data file.

26. The method of claim 23, where the parser instructions stored in the format description table include one or more syntax identifiers.

27. The method of claim 26, where at least one of the syntax identifiers provides instructions for performing arithmetic operations on the navigation data read from the navigation database.

28. The method of claim 26, where at least one of the syntax identifiers provides instructions related to a format type of the navigation data to be read from the navigation database.

* * * * *